July 12, 1960

L. MODRIN 2,944,566

CONTROL VALVES HAVING FLUID-TIGHT DISTRIBUTOR
MEMBERS, PARTICULARLY FOR VEHICLE
BRAKING CIRCUITS

Filed Feb. 12, 1957

L. MODRIN 2,944,566

CONTROL VALVES HAVING FLUID-TIGHT DISTRIBUTOR
MEMBERS, PARTICULARLY FOR VEHICLE
BRAKING CIRCUITS

Filed Feb. 12, 1957

July 12, 1960
L. MODRIN
2,944,566
CONTROL VALVES HAVING FLUID-TIGHT DISTRIBUTOR
MEMBERS, PARTICULARLY FOR VEHICLE
BRAKING CIRCUITS
Filed Feb. 12, 1957
4 Sheets-Sheet 4
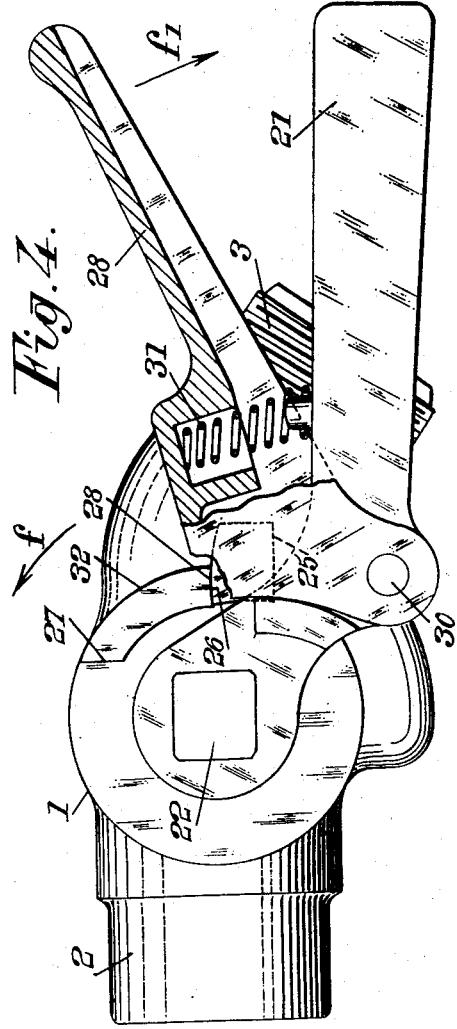
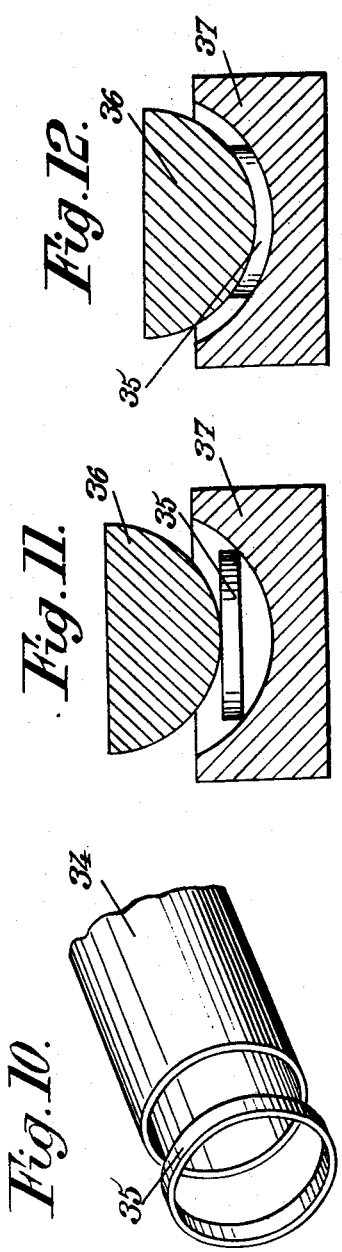

United States Patent Office 2,944,566
Patented July 12, 1960

2,944,566

CONTROL VALVES HAVING FLUID-TIGHT DISTRIBUTOR MEMBERS, PARTICULARLY FOR VEHICLE BRAKING CIRCUITS

Louis Modrin, Saint-Etienne, France, assignor to L'Auxiliaire de l'Industrie et des Mines Auxim, Saint-Etienne (Loire), France, a society of France Filed Feb. 12, 1957, Ser. No. 639,651

5 Claims. (Cl. 137—620)

The invention relates to control valves of the kind comprising control members, such as for example distributors, mounted in a fluid tight manner in bores in housings and displaceable to control supply or distribution of a fluid, and the invention is particularly applicable to air cocks for controlling the brakes on rail vehicles or the like.

An object of the invention is to provide an improved arrangement of control valves which conforms better than known valves to the various desiderata of practical working, particularly as regards simplicity of construction and fluid-tightness.

According to the invention there is provided a control valve of the type comprising a housing having a bore, a cage mounted within the bore, flexible sealing rings arranged to bear against the edges of openings in the wall of the cage, and a control member displaceable within the cage, characterised in that the edges of said openings are provided with bevels formed by a milling tool having its axis arranged transversely to that of the cage.

Apart from this main arrangement, the invention comprises certain other arrangements which are preferably used at the same time and which will be hereinafter discussed in greater detail, viz:

A second arrangement, which is preferably used with the preceding arrangement provided with locking rings adapted to co-operate with the aforementioned flexible rings, in which the locking rings are formed from parallel sided ring blanks cut from a tube section of rigid or semi-rigid material, the ring blanks being deformed by stamping between two part-cylindrical surfaces having curvatures substantially equal to the curvature of the bore in the housing.

A third arrangement which is particularly suitable for use in a pipe system, one section of which is adapted to be connected to exhaust, such as for example the cock of a brake control system, which arrangement comprises a rotatable control member provided with at least two conduits arranged at different levels and parallel to one another, the two conduits co-operating with two series of ports in the housing staggered angularly with respect to one another, and one of the conduits, which is preferably of smaller cross section, serving to connect the pipe section to exhaust.

And a fourth arrangement, in which flexible sealing rings are secured opposite corresponding ports in the housing, the flexible rings being carried by the frame or by a cage fixed in the frame, preferably with rigid locking rings for holding the flexible rings in position, this arrangement consisting in that certain at least of the said rings are given a diameter greater than that of the corresponding ports, thus leaving a certain free intermediate space at right-angles to the said ports and between the rotating control member and the wall of the housing.

A control valve according to the invention which is particularly suitable for use as a cock for controlling the supply of compressed air in brake control systems of vehicles, will now be described by way of example with reference to the accompanying drawings, in which:

Figs. 1 to 4 show respectively an axial section, sections on the lines II—II and III—III of Fig. 1 and a plan view of the cock.

Fig. 10 is a perspective view showing the manufacture from a tube of one of the locking rings included in the cock.

Figs. 11 and 12 finally illustrate the means for forming such a locking ring, these views being diagrammatic sections in two successive operative positions.

Figure 1:
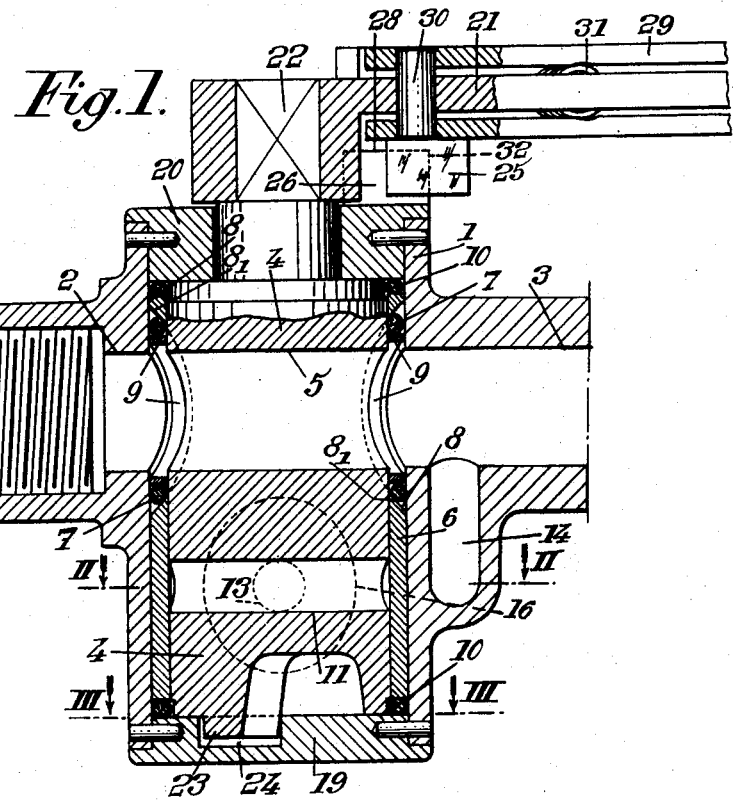

The cock consists of a housing 1 having two connections or unions 2 and 3 adapted to be connected respectively to the upstream section and the downstream section of the main brake pipe of a brake control system, and a rotatable plug 4 formed with a main passage 5 adapted to co-operate with the aforementioned unions in such manner as to connect them (open position shown in Fig. 1) or to shut them off from one another (closed position at an angle of 90° from the open position), the fluid-tightness between the housing 1 and the rotating plug 4 being assured by means of rings 7, 10 made of plastic material and positioned by means of a cage 6 fixed in the body or housing 1.

The rings 7 are secured opposite the unions 2, 3 substantially along the connecting profile between the cylindrical surface of these unions and the internal cylindrical surface of the cock. The rings 7 are located against the saddle-shaped peripheries of corresponding openings 8 in the cage 6 and are held in position by saddle-shaped locking rings 9 made of metal.

The two rings 10 are disposed between the ends of the cage 6 and the ends of the housing in planes normal to the axis of the cock.

As is known, rings of this type enable fluid-tightness to be assured, whatever may be the pressure, without the necessity of adjusting the rotating plug in its bore, it being possible to have appreciable clearance between the plug 4 and the cage 6.

Figure 6:
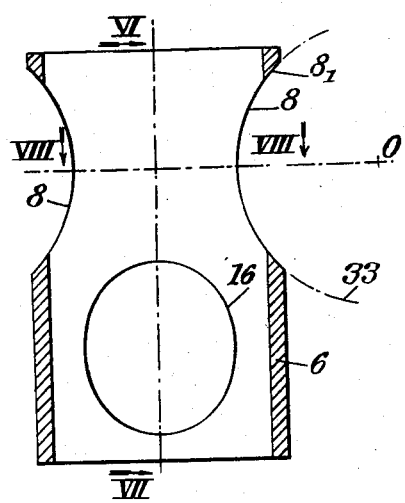
Figs. 6 to 9 are separately and respectively views of the cage which is included in the said cock, these views being axial sections on the lines VI—VI (Fig. 7) and VII—VII (Fig. 6), and transverse sections on the lines VIII—VIII (Fig. 6) and IX—IX (Fig. 7).
Figure 7:
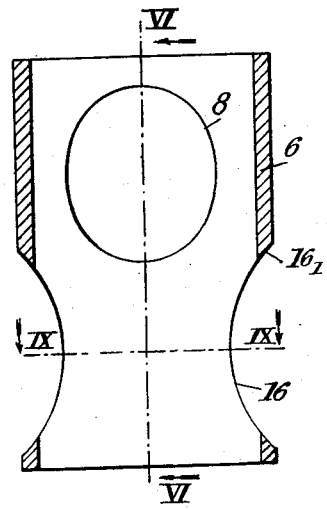
Figure 8:
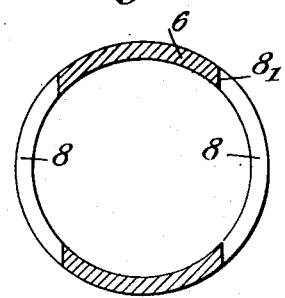
Figure 9:
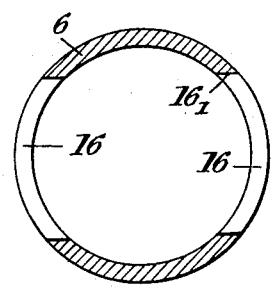

The openings 8 in the cage 6 are formed by a milling operation which is carried out by means of a milling tool such as represented at 33 in Fig. 6, having its centre O at a suitably calculated position.

Experience has shown that when proceeding in this manner and advantageously when using the locking rings which are about to be referred to, the edges in the form of bevels $8_1$ of the openings 8, due to the milling operation, ensure that the rings 7 are held in position in a suitable manner, and in addition the machining is considerably simplified.

The locking rings 9 are formed from tubes 34 (Fig. 10) which are cut perpendicularly of their axis in order to obtain blanks such as those shown at 35 (Fig. 10), and each blank is deformed by stamping (Figs. 11 and 12) between two cylindrical surfaces 36, 37 having curvatures substantially equal to those of the internal and external surfaces of the wall of the cage 6.

It is found that rings made in this manner, once they are positioned inside the openings 8, ensure that the plastic rings 7 are maintained in annular slots formed by the housing 1, the edges $8_1$ and the locking rings 9. The plastic rings 7 are compressed in such manner that they bear against the rotating plug and thus ensure fluid-tightness. However, the fact that the profile of the slots tends to be constricted towards the plug opposes the extraction of the plastic rings 7.

The methods of forming the openings 8 in the cage 6 and the locking rings 9 could of course be used on any type of cock which comprises rotating or sliding members made fluid-tight by flexible rings and locking rings as referred to above.

The exhaust of the downstream pipe connected to the union 3 is achieved by means of a second passage 11 formed in the plug and disposed parallel to the main passage 5. The passage 11 co-operates with two ports 12, 13 formed in the housing, the opening 12 being permanently connected to the union 3 by a conduit or quarter-circular channel 14 cast in one piece with the housing, and the other port 13 being open to atmosphere or connected to any exhaust system. The two ports 12, 13 are offset from the unions 2, 3 by an angle of 90°.

A very good fluid-tightness is ensured in the closed position of the cock, since the air under pressure reaching the port 12 by way of the conduit 14 would only be able to escape at 13 after having traversed the cock assembly. This fluid-tightness is moreover preferably assured by two other toric rings 15 made of plastic material and disposed around the ports 12, 13, the rings 15 being located between the saddle-shaped peripheries of corresponding openings 16 formed in the cage 6 and being held by saddle-shaped locking rings 9 of the same type as referred to above.

Figure 2:
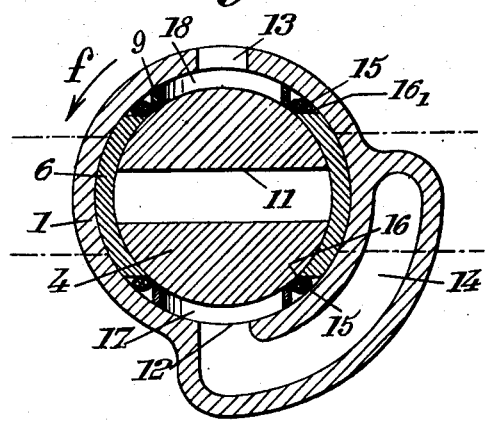
Figure 5:
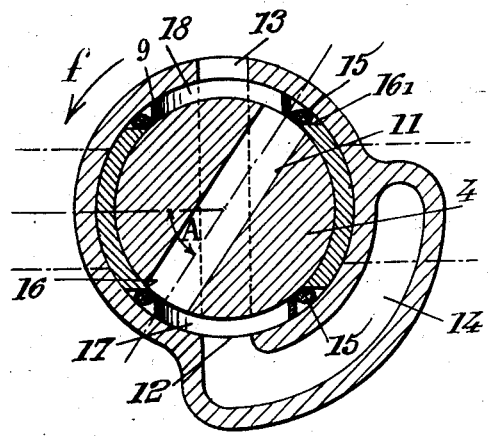
Fig. 5 is a view similar to Fig. 2 showing the same cock but in a different operative position.

The rings 15 and the openings 16, are advantageously given a diameter considerably larger than that of the ports 12 and 13, so that when the plug is rotated in the direction of the arrow f from its open position (Fig. 2) to its closed and exhaust position, the exhaust operation commences at a suitable angle A, for example of the order of 45° or less (Fig. 5).

It will be seen that in this case the openings 16 define intermediate spaces between the plug 4 and the housing 1, these spaces 17 and 18 being traversed by the exhaust air (Fig. 5).

The mounting of the rings 15 and also the shaping of the corresponding openings 16 will have preferably been carried out in the manner previously indicated in connection with the rings 7 and the openings 8, the edges 16' of the openings 16 co-operating with the rings 15 being obtained by milling.

The assembly is completed by end caps 19 and 20, which contribute to the positioning of the rings 10, and by a handle or other control member 21 mounted on a shaft 22.

Figure 3:
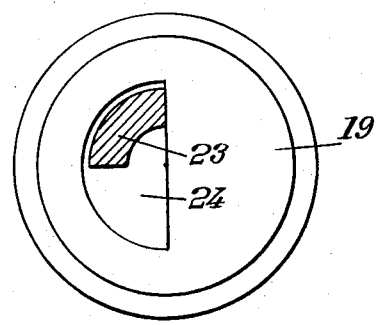

It is also advantageous to provide stop means and/or locking means for the operative open and closed positions of the cock and, as shown in Figs. 3 and 4, a stop member or protrusion 23 in the form of a 90° sector or quarter circle is provided at one end of the plug opposite to that carrying the handle, the stop member 23 being adapted to co-operate with a recess or semi-circular opening 24 in the form of a 180° sector formed in the end cap 19, thus permitting movement of the plug through an angle of 90°. Another stop member 25 is carried by a lever 29 pivoted at 30 to the handle 21, the said stop member 25 being adapted to co-operate with one or other of two bearing surfaces 26, 27 of a cam or boss 28 carried by the end cap 20. A spring 31 biases the lever 28 away from the handle 21 and serves to lock the handle in one or other of its operative positions.

Fig. 4 shows the locking position corresponding to the open position of the cock, with the stop member 25 engaging against the bearing surface 26. When it is desired to operate the cock in the direction of the arrow f towards its closed and exhaust position, it is necessary first of all to unlock the handle by moving the lever 29 against the action of the spring 31 (direction of the arrow $f_1$). The stop member 25 then leaves the bearing surface 26 and during the subsequent movement of the handle, slides on a bearing surface in the form of a sector 32. At the end of the movement, the stop member 25 drops behind the stop surface 27, thus locking the handle in the closed and exhaust position.

It will be seen that the operation of the cock is very simple and allows the exhaust to start at an intermediate position of the plug (such as that shown in Figure 5) at which the closing of the cock is produced, or is about to be produced, that is to say, the breaking of the connection between the unions 2 and 3 through the passage 5. The exhaust is continued until the cock reaches the completely closed position, for example by completing its rotational movement through a quarter of a revolution (90°), this position being shown in dotted lines in Fig. 5.

The above described cock has a number of advantages over those cocks of this type which are already in existence, viz.:

That of permitting particularly simple manufacture,

That of ensuring the fluid-tightness under the best conditions,

That of permitting the exhaust to commence after any desired angular travel of the plug, this being a function of the diameter chosen for the recesses such as 16, And that of ensuring the necessary locking actions for the operating handle.

The invention is not limited in any way to the embodiment described or to the construction of its various parts which have already been particularly set forth, but it does in fact cover all the possible variations.

I claim:

1. A valve comprising a valve body having a cylindrical bore and inlet and outlet openings aligned and connected to said bore in diametrically opposed positions, a hollow sleeve fixed in said bore and having openings corresponding to the first said openings but larger than the latter, said sleeve having bevelled edges at said openings and defining with said body annular troughs, sealing rings in said troughs, rigid rings holding said sealing rings in position with the latter tending to protrude internally of said sleeve, a rotatable cylindrical plug in said sleeve frictionally engaging said rings and having axially spaced transverse passages arranged in parallel and one of which is aligned between said inlet and outlet openings to connect the same, said sleeve and body having further openings diametrically aligned transversely of the first said openings and alignable with the other of said passages, and means for coupling the outlet opening to one of the further openings in said body, the openings in said sleeves having saddle-shaped peripheries and the rigid rings which hold the sealing rings in position also being saddle-shaped.

2. A valve as claimed in claim 1 wherein said further openings in said sleeve are substantially larger than the further openings in said body to facilitate connection between the latter said further openings and said other passage.

3. A valve as claimed in claim 1 comprising means on said valve body defining a half-circular opening concentric with said rotatable plug, and a quarter-circular protrusion on said plug and concentric therewith, said protrusion being engaged in the latter, said opening to permit a ninety degree turn of said plug relative to said body, said protrusion being positioned on said plug to permit a selective registration of said passages with said inlet and outlet and further openings.

4. A valve as claimed in claim 3 comprising a cam on said valve body and having surfaces displaced by about ninety degrees, a handle section connected to said plug to rotate the same, and a further handle section pivotal on the first said section and including an engaging member pivotal therewith for selective engagement of said cam surfaces to lock said plug in position.

5. A valve as claimed in claim 1 wherein said means defines a quarter-circular channel on the periphery of said valve body, said channel extending between the levels of said passages and, at one end, being connected to the outlet opening and, at its other end, extending through said valve body for registration with one of the further passages in said plug.

References Cited in the file of this patent

UNITED STATES PATENTS

| | | |
|---|---|---|
| 873,475 | Woods | Dec. 10, 1907 |
| 1,610,383 | Johnson | Dec. 14, 1926 |
| 2,642,651 | Palley | June 23, 1953 |
| 2,657,615 | Jones | Nov. 3, 1953 |
| 2,729,993 | Preller | Jan. 10, 1956 |

FOREIGN PATENTS

| | | |
|---|---|---|
| 731,100 | Great Britain | June 1, 1955 |